United States Patent
Ruelle

(10) Patent No.: US 12,321,739 B2
(45) Date of Patent: Jun. 3, 2025

(54) MICROCONTROLLER, COMPUTER PROGRAM PRODUCT, AND METHOD FOR ADDING AN ADDITIONAL FUNCTION TO A COMPUTER PROGRAM

(71) Applicant: STMicroelectronics (Grand Ouest) SAS, Le Mans (FR)

(72) Inventor: Frederic Ruelle, Marigné-Laillé (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 114 days.

(21) Appl. No.: 17/660,092

(22) Filed: Apr. 21, 2022

(65) Prior Publication Data

US 2022/0342655 A1 Oct. 27, 2022

(30) Foreign Application Priority Data

Apr. 22, 2021 (FR) .................................... 2104197

(51) Int. Cl.
*G06F 8/65* (2018.01)
*G06F 8/41* (2018.01)
*G06F 12/14* (2006.01)

(52) U.S. Cl.
CPC ................ *G06F 8/65* (2013.01); *G06F 8/41* (2013.01); *G06F 12/1408* (2013.01); *G06F 2212/1052* (2013.01)

(58) Field of Classification Search
CPC .......... G06F 8/41; G06F 8/65; G06F 12/1408; G06F 2212/1052
See application file for complete search history.

(56) References Cited

U.S. PATENT DOCUMENTS

| | | | | |
|---|---|---|---|---|
| 6,789,157 B1* | 9/2004 | Lilja | ................... | G06F 12/0246 711/170 |
| 7,055,146 B1* | 5/2006 | Durr | ................... | G06F 9/44521 717/162 |
| 7,412,700 B2* | 8/2008 | Lari | ......................... | G06F 8/61 717/169 |
| 7,657,695 B1* | 2/2010 | Wheeler | ................. | G06F 9/455 711/6 |
| 8,392,895 B2* | 3/2013 | Tsai | ......................... | G06F 8/54 717/162 |
| 9,361,102 B2* | 6/2016 | Tan | ......................... | G06F 9/323 |
| 10,496,493 B1* | 12/2019 | Lieberman | .......... | G06F 11/1469 |

(Continued)

FOREIGN PATENT DOCUMENTS

CA 2776024 A1 12/2012

*Primary Examiner* — Douglas M Slachta
(74) *Attorney, Agent, or Firm* — Slater Matsil, LLP

(57) ABSTRACT

According to one aspect, a method adds an additional function to a computer program installed on a microcontroller, the computer program using a table configured to associate an identifier of the additional function with a pointer to a memory address. The method includes the microcontroller obtaining a compiled code of the additional function and an identifier of this additional function, the microcontroller recording the compiled code of the additional function in a section of a memory, and recording in memory a pointer in the table, the pointer being aimed at the address of the memory section in which the compiled code of the additional function is recorded, the pointer being associated in the table with the identifier of the additional function.

20 Claims, 2 Drawing Sheets

(56) References Cited

U.S. PATENT DOCUMENTS

| | | | | |
|---|---|---|---|---|
| 10,817,269 B2* | 10/2020 | Martini | | G06F 8/61 |
| 11,816,206 B2* | 11/2023 | Tsirkin | | G06F 21/78 |
| 2004/0059867 A1* | 3/2004 | Heinemann | | G05B 19/042 |
| | | | | 717/173 |
| 2006/0112368 A1* | 5/2006 | Gowen | | G06F 9/44526 |
| | | | | 717/100 |
| 2006/0123198 A1* | 6/2006 | Asao | | G06F 9/449 |
| | | | | 711/137 |
| 2006/0206691 A1* | 9/2006 | Goodhue | | G06F 9/3013 |
| | | | | 712/205 |
| 2007/0118680 A1* | 5/2007 | Boudou | | G06F 21/79 |
| | | | | 711/103 |
| 2008/0243964 A1* | 10/2008 | Baker | | G06F 9/44521 |
| 2009/0327650 A1* | 12/2009 | Neuerburg | | G06F 12/0638 |
| | | | | 711/219 |
| 2010/0094847 A1* | 4/2010 | Malan | | H04L 69/18 |
| | | | | 707/705 |
| 2010/0153745 A1* | 6/2010 | Onno | | G06F 21/125 |
| | | | | 713/190 |
| 2011/0131389 A1* | 6/2011 | Gremaud | | G06F 12/1009 |
| | | | | 711/E12.078 |
| 2011/0191403 A1* | 8/2011 | Sig | | G06F 15/16 |
| | | | | 709/201 |
| 2012/0131349 A1* | 5/2012 | Layson | | G06F 21/121 |
| | | | | 713/182 |
| 2012/0185837 A1* | 7/2012 | Beatty, III | | G06F 8/54 |
| | | | | 717/162 |
| 2012/0260038 A1* | 10/2012 | Imazaki | | G06F 3/0644 |
| | | | | 711/E12.001 |
| 2013/0067442 A1* | 3/2013 | Miyazaki | | G06F 9/45516 |
| | | | | 717/139 |
| 2013/0145353 A1* | 6/2013 | Tsai | | G06F 8/54 |
| | | | | 717/162 |
| 2013/0232573 A1* | 9/2013 | Saidi | | G06F 21/6218 |
| | | | | 726/22 |
| 2014/0043636 A1* | 2/2014 | Akatsu | | G06F 3/1225 |
| | | | | 358/1.13 |
| 2014/0279985 A1* | 9/2014 | Fontenot | | G06F 21/57 |
| | | | | 707/698 |
| 2015/0089491 A1* | 3/2015 | Wang | | G06F 9/453 |
| | | | | 717/175 |
| 2015/0160940 A1* | 6/2015 | Hufnagel | | G06F 8/65 |
| | | | | 717/168 |
| 2015/0169226 A1* | 6/2015 | Shen | | G06F 12/0238 |
| | | | | 711/103 |
| 2015/0356294 A1* | 12/2015 | Tan | | G06F 21/53 |
| | | | | 726/22 |
| 2016/0048378 A1* | 2/2016 | Varma | | G06F 8/434 |
| | | | | 717/141 |
| 2016/0077872 A1* | 3/2016 | Gu | | G06F 9/4881 |
| | | | | 718/102 |
| 2016/0378396 A1* | 12/2016 | Ramanujan | | G06F 12/0866 |
| | | | | 711/105 |
| 2017/0083372 A1* | 3/2017 | Lin | | G06F 3/0685 |
| 2017/0083701 A1* | 3/2017 | Tajalli | | G06F 21/79 |
| 2017/0177243 A1* | 6/2017 | Trika | | G06F 11/2094 |
| 2018/0026653 A1* | 1/2018 | Cutter | | G06F 12/109 |
| 2018/0321956 A1* | 11/2018 | Wang | | G06F 9/449 |
| 2021/0294736 A1* | 9/2021 | Hua | | G06F 12/0238 |

\* cited by examiner

MICROCONTROLLER, COMPUTER PROGRAM PRODUCT, AND METHOD FOR ADDING AN ADDITIONAL FUNCTION TO A COMPUTER PROGRAM

CROSS-REFERENCE TO RELATED APPLICATIONS

This application claims the benefit of French Patent Application No. 2104197, filed on Apr. 22, 2021, which application is hereby incorporated herein by reference.

TECHNICAL FIELD

Implementations and embodiments relate to computer program products, in particular embedded in microcontrollers, and more particularly to the addition of additional functions to such embedded programs.

BACKGROUND

The microcontrollers for general use incorporate more and more programs. The programs can be configured to have various functionalities. Sometimes, certain functionalities of a program can be maintained unavailable for a final user as long as these functionalities are not requested by the user.

It can be important to be able to make available functionalities of a program initially unavailable.

In order to add functionalities to a program, it is possible to update the program in its entirety. Nevertheless, this solution involves the microcontroller downloading the entire new program, and thus a significant quantity of data.

It is also possible to update only a part of the program, but this can alter the initial program.

For these two solutions, an image of the original program should further be stored in memory in order to allow a return of the program to its original version, in the case of a malfunction of a new version of the program.

It is also possible to provide a licensing system in order to activate functionalities initially integrated into the program but unavailable for the user. In this case, all the functionalities of the program are initially installed but some are maintained unavailable for the user. The user can obtain a license to use these initially unavailable functionalities.

Such a solution requires installing all the functionalities of a program even if no license for these functionalities is obtained later. This therefore involves storing a large quantity of data in memory. However, microcontrollers generally include limited memory resources.

Moreover, the use of a license system requires complex mechanisms in order to be reliable. These mechanisms can be bypassed by computer attacks, for example hardware attacks of the apparatus.

Embodiments therefore are proposed for allowing the adding of additional functionalities to a program, that do not have the aforementioned disadvantages.

SUMMARY

According to one aspect, a method is proposed for adding an additional function to a computer program installed on a microcontroller, the computer program using a table configured to associate an identifier of the additional function with a pointer to a memory address, the method comprising the microcontroller obtaining a compiled code of the additional function and an identifier of this additional function, the microcontroller recording the compiled code of the additional function in a section of a memory, and recording in memory a pointer in the table, the pointer being aimed at the address of the memory section in which the compiled code of the additional function is recorded, the pointer being associated in the table with the identifier of the additional function.

In particular, the program is configured to reserve a section of the memory for each additional function that can be added to the program.

Moreover, the program can be configured to identify whether an additional function is available by verifying whether the identifier of this additional function is associated in the table with a pointer to a memory address. If a pointer to a memory address is associated with the identifier of the additional function, then the program is configured to deduce therefrom that the additional function is available. In particular, the memory address at which the pointer is aimed is the starting address of the memory section in which the compiled code is recorded.

In order to execute an available additional function, the program is configured for the microcontroller to read the address at which the pointer stored in the table and associated with the identifier of the additional function is aimed. The microcontroller is thus configured for the microcontroller to access the memory section in which the compiled code of the additional function is recorded on the basis of the address read.

The available additional function allows to add a new functionality to the program.

Such a method allows to add a new functionality to the program without having to obtain a new version of the program. Moreover, such a method allows to add a new functionality to the program without modifying the compiled code of the program initially installed on the microcontroller. In other words, the method allows to extend the functionalities of the program without having to modify the program installed on the microcontroller. Because the program installed on the microcontroller is not modified, the program can be considered to be a root of trust.

The program can be recorded on an internal flash memory having protection means allowing to make the program non-modifiable. Alternatively, it is possible to record the program in a memory non-modifiable by nature (in particular a Read-Only Memory ROM memory).

Moreover, to update an additional function made available, it suffices to obtain a new version of the compiled code of the additional function and to replace the compiled code of the previous version recorded in memory with that of the new version.

The method allows to independently add various additional functions to a program.

Moreover, such a method allows to avoid a bootloader to install an additional function.

Such a method also allows to not have to protect against rollbacks to an older version of the program.

Moreover, such a method can allow to not store an image of the original program (factory image) in the memory of the microcontroller, since it is the original program that continues to be used even after the addition of additional functions to the program.

Such a method allows to avoid the use of a license system in which the program installed on the microcontroller initially comprises the additional functions in an unavailable state.

In an advantageous embodiment, obtaining the compiled code of the additional function and its identifier comprises receiving a packet containing the compiled code and metadata including at least the identifier, the compiled code being encrypted, then decrypting the compiled code of the additional function.

The metadata is data associated with the additional function. This metadata allows in particular to describe the additional function.

In particular, the packet can be transmitted by a server remote with respect to the microcontroller. The remote server comprises the compiled code of the additional function as well as its identifier. The remote server is configured to encrypt the compiled code of the additional function then to create the packet on the basis of the encrypted compiled code and the identifier of the additional function.

The method allows the remote server to prepare only one packet including the compiled code of the additional function and the identifier. The remote server does not have to prepare a packet including the entirety of a new version of the program. This allows to transmit a smaller quantity of data to the microcontroller.

Advantageously, the packet is encrypted according to symmetrical encryption on the basis of a unique key associated with the microcontroller, the microcontroller comprising the unique key.

The unique key is thus also known to the remote server. The remote server is thus configured to encrypt the packet on the basis of this unique key.

Thus, an encrypted compiled code of the additional function can only be decrypted by the microcontroller for which the packet is intended. In order to make available an additional function for various microcontrollers, it thus suffices to transmit to the microcontrollers packets encrypted using the various unique keys associated with the various microcontrollers.

Preferably, the memory in which the compiled code is stored is a flash memory.

It is possible to record the compiled code in an external flash memory of the microcontroller.

Nevertheless, in an advantageous embodiment, the flash memory is a flash memory internal to the microcontroller.

The recording of the compiled code of the additional function in an internal flash memory of the microcontroller allows to better protect this compiled code. In particular, an internal flash memory is difficult to observe from the outside of the microcontroller.

Moreover, it is possible to use means for protection of the internal flash memory. In particular, such protection means can be configured to make the internal flash memory unreadable from the outside of the microcontroller. Thus, it is made difficult for an outside person to obtain the compiled code of the additional function.

Advantageously, the table is recorded in a random-access memory (also known by the acronym RAM) of the microcontroller. Alternatively, the table can be recorded in a flash memory.

In an advantageous embodiment, the method further comprises the microcontroller obtaining a hash value with the additional function and the identifier, then the microcontroller hashing the compiled code of the additional function, then the microcontroller comparing a result of this hash to the hash value obtained by the microcontroller, then validation of the additional function only if the result of the hash is equal to the hash value obtained by the microcontroller.

The validation allows to know whether the additional function is an authorized function. If the additional function is not authorized, the additional function is refused by the program and cannot therefore be used.

The hash value can be included in the packet containing the compiled code of the additional function and the identifier. Such a packet can be protected in terms of authentication and in terms of integrity, for example via an electronic signature.

According to another aspect, a computer program product is proposed comprising instructions which, when the program is executed by a computer (in particular a microcontroller), lead the latter to generate a table in a memory, the table being configured to associate an identifier of the additional function with a pointer to a memory address, obtain a compiled code of the additional function and an identifier of the additional function, record the compiled code of the additional function in a section of a memory, and record a pointer in the table, the pointer being aimed at the address of the memory section in which the additional function is recorded and being associated in the table with the identifier of the additional function.

In an advantageous embodiment, the computer program product comprises instructions which, when the program is executed by a computer (in particular a microcontroller), lead the latter to identify whether an additional function is available by verifying whether the identifier of this additional function is associated in the table with a pointer to a memory address, then, when an available additional function is called, obtain the memory address associated with the identifier of this additional function in the table then execute the compiled code of the additional function recorded in a memory section on the basis of the memory address obtained.

According to another aspect, a microcontroller is proposed comprising a memory containing a computer program as described above, and being configured to be able to implement a method for adding an additional function to the computer program as described above.

BRIEF DESCRIPTION OF THE DRAWINGS

Other advantages and features of the invention will appear upon examination of the detailed description of embodiments and implementations, in no way limiting, and of the appended drawings in which.

DETAILED DESCRIPTION OF ILLUSTRATIVE EMBODIMENTS

Figure 1:
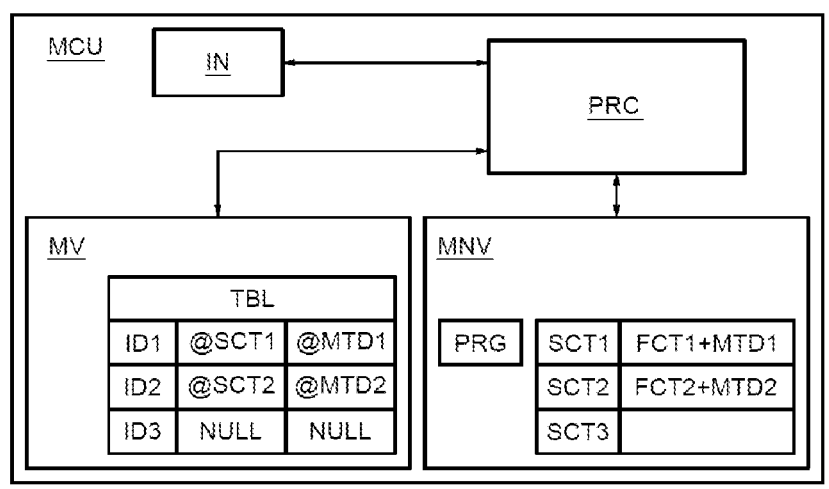
FIG. 1 illustrates a microcontroller configured to add an additional function to a computer program.

FIG. 1 illustrates a microcontroller MCU configured to be able to implement a method for adding an additional function to a computer program PRG according to an embodiment of the invention.

The microcontroller MCU comprises at least one non-volatile memory MNV. The non-volatile memory MNV can be used to store the computer program PRG. The non-volatile memory MNV can be a flash memory.

The microcontroller MCU comprises a processor PRC configured to be able to execute the program PRG. To do this, the processor PRC is connected to the non-volatile memory MNV.

The program PRG comprises initial functions that can be used as soon as the program PRG is installed. The program PRG is in particular a firmware integrated into the microcontroller MCU.

Moreover, the program PRG is configured to allow an addition of additional functions. The additional functions are functions that are not initially available.

The non-volatile memory MNV can also be used to record additional function of the program PRG. In particular, certain sections SCT1, SCT2, SCT3 of this memory MNV can be reserved by the program PRG during its installation to record additional functions.

For example, in FIG. 1, an additional function FCT1 and metadata MTD1 that is associated with it are recorded in the section SCT1. An additional function FCT2 and metadata MTD2 that is associated with it are recorded in the section SCT2. No additional function is currently recorded in the section SCT3.

The microcontroller also comprises a volatile memory MV. This volatile memory can be a RAM (acronym for Random-Access Memory) memory. The memory MV can be configured to store a table TBL of the program PRG. This table TBL is used to indicate the availability of at least one additional function. The processor PRC is connected to the volatile memory MV.

The table TBL comprises three fields associated with each other. A first field is dedicated to identifiers associated with the additional functions that can be installed. A second field is dedicated to pointers allowing to indicate the starting memory address of a memory section in which a compiled code of an additional function is recorded. A third field is dedicated to pointers allowing to indicate a memory address starting from which metadata associated with an additional function is recorded.

In particular, for each additional function installed, the table TBL associates with the identifier of the additional function installed a pointer to a starting memory address of the memory section in which a compiled code of the additional function is recorded.

Moreover, for each additional function not installed, the table TBL associates with the identifier of the additional function not installed a null pointer. This null pointer allows to indicate to the program PRG that the additional function is not installed.

For example, in FIG. 1, the table has three identifiers ID1, ID2, ID3. The identifier ID1 is the identifier associated with the additional function FCT1. The identifier ID2 is the identifier associated with the function FCT2. The identifier ID3 is the identifier associated with a third additional function not yet obtained by the microcontroller MCU.

A pointer @SCT1 aimed at the starting address of the section SCT1, in which the compiled code of the additional function FCT1 is recorded, is associated with the identifier ID1. Moreover, a pointer @MTD1 aimed at the memory address starting at which the metadata associated with the additional function FCT1 is recorded is associated with the identifier ID1.

A pointer @SCT2 aimed at the starting address of the section SCT2, in which the compiled code of the additional function FCT2 is recorded, is associated with the identifier ID2. Moreover, a pointer @MTD2 aimed at the memory address starting at which the metadata associated with the additional function FCT2 is recorded is associated with the identifier ID2.

Null pointers NULL are associated with the identifier ID3 since the third additional function has not yet been obtained by the microcontroller MCU.

The microcontroller MCU comprises at least one input IN configured to receive the at least one additional function. The processor PRC is connected to the input IN to obtain each additional function.

In particular, the input IN can be an input port configured to be connected to the Internet network. The input IN can also be a radioelectric antenna.

In particular, each additional function that can be received by the microcontroller MCU can be comprised in a packet. The additional function is a compiled code adapted to be able to be executed by the microcontroller MCU.

The packet also comprises metadata in addition to the additional function. The metadata includes in particular an identifier of the additional function and the size of the additional function.

The metadata can also include other information. For example, the metadata can also include an icon associated with the additional function. This icon can thus be displayed during the execution of the program PRG in such a way as to be able to indicate to the user that the additional function is available.

The metadata is protected in terms of integrity and in terms of authenticity, for example via an electronic signature included in the packet.

Moreover, the compiled code of the additional function included in the packet can be encrypted.

Thus, the microcontroller MCU comprises decryption means integrated into the processor PRC. These decryption means are configured to be able to decrypt each compiled code of additional function received by the microcontroller MCU. The decryption means comprise a unique key adapted to allow the decryption of each compiled code received.

The program PRG is configured for the processor to use the decryption means to decrypt the compiled code of the additional function included in the packet received.

The program PRG is configured in order for the processor to install an additional function after having received and decrypted the packet containing it.

To do this, the program PRG is configured in order or the processor to record the additional function and its associated metadata in a section of the memory MNV.

Moreover, the program PRG is configured in order for the processor to associate in the table TBL the identifier of the additional function with the address of the beginning of the section of the memory in which the additional function and the associated metadata is recorded.

The program PRG is also configured in order for the processor to scan the table TBL to identify each additional function available, and to execute each additional function on the basis of the address associated with this additional function recorded in the table TBL. The execution can be based on a triggering criterion provided in the initial program PRG which can depend on the metadata contained in the packet received.

In particular, when the additional function is called, the program PRG is configured in order for the processor to read the address indicated by the pointer recorded in the table TBL associated with the identifier of the additional function, then in order for it to execute the additional function on the basis of the compiled code recorded in the memory section starting at the address indicated by the pointer.

Figure 2:
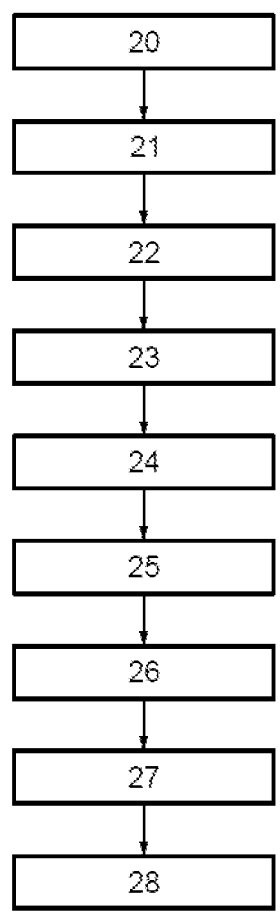
FIG. 2 illustrates a method for updating a program by the microcontroller of FIG. 1.

FIG. 2 illustrates a method for updating of a program PRG as described above by the microcontroller MCU.

At the beginning of the method, the program PRG is installed on the microcontroller MCU. Nevertheless, at least one additional function of the program PRG is unavailable because it is not installed on the microcontroller MCU.

The update of the microcontroller MCU can follow a request from a user owning the microcontroller MCU. This request allows to request the installation of an additional function from a remote server. This request can be transmitted to the remote server via the Internet network.

The method comprises a step 20 in which the remote server obtains a compiled code of the additional function and metadata associated with this compiled code. This compiled code and this metadata can be recorded on the remote server.

Then, in step 21, the remote server creates a packet containing the compiled code of the additional function and the metadata that is associated with it. As seen above, the metadata is protected in terms of integrity and in terms of authenticity, for example via an electronic signature included in the packet. The metadata contains in particular a hash value obtained by carrying out a hash of the compiled code of the additional function.

Then, in step 22, the remote server encrypts the compiled code according to a symmetric encryption on the basis of a unique key known only by the microcontroller MCU and the remote server.

The packet comprising the encrypted compiled code and the metadata is then transmitted to the microcontroller MCU in step 23, in particular via the Internet network.

Once the packet has been received by the microcontroller MCU, in step 24, the microcontroller MCU decrypts the compiled code of the additional function by using the unique key.

Then, in step 25, the microcontroller MCU carries out a procedure of authentication of the additional function. This procedure of authentication allows to know whether the additional function received is an authorized additional function.

To do this, the microcontroller MCU carries out a hash of the compiled code of the additional function then compares the result of the hash to the hash value comprised in the metadata received by the microcontroller MCU.

If the result of the hash is equal to the hash value comprised in the metadata, this means that the additional function is authorized. The microcontroller MCU thus authorizes the use of the additional function. Otherwise, the additional function received is not authorized and the microcontroller MCU prevents the use of the additional function.

Moreover, the microcontroller verifies the signature associated with the metadata.

Then, in step 26, the microcontroller MCU installs the decrypted compiled code of the additional function and the associated metadata. In particular, the microcontroller MCU records the decrypted compiled code and the metadata in a memory section of the memory. This memory section is a section reserved by the program PRG during its installation on the microcontroller MCU.

Then, in step 27, the microcontroller MCU analyses the memory section in which the additional function is recorded and identifies the metadata.

The metadata provides information on the additional function. The metadata comprises in particular an identified already known by the program PRG.

In step 28, the microcontroller MCU associates in the table TBL the identifier of the additional function with a pointer aimed at the starting address of the memory section in which the additional function is recorded.

The program PRG is thus updated by allowing it to execute the additional function, without modifying the initial compiled code of the program PRG.

Thus, to execute the additional function, the microcontroller MCU searches for the identifier of the additional function in the table TBL. The microcontroller then verifies if the pointer stored in the table TBL and associated with the identifier of the additional function is null. If the pointer is null, the microcontroller considers that the additional function is not available and cannot therefore execute it. If the pointer is not null, the microcontroller obtains the address indicated by the pointer so as to obtain the starting address of the memory section in which the compiled code of the additional function is recorded. The program PRG can thus execute the compiled code by jumping to the starting address of the memory section.

Such a method allows to add a new functionality to the program without having to obtain a new version of the program. Moreover, such a method allows to add a new functionality to the program without modifying the compiled code of the program initially installed on the microcontroller. In other words, the method allows to extend the functionalities of the program without having to modify the program installed on the microcontroller.

The program installed can be protected in an ad hoc manner to be able to be considered to be a root of trust. Because the program installed on the microcontroller is not modified by the installation of additional functions, the program can continue to be considered to be a root of trust after an installation of additional functions.

Moreover, to update an additional function made available, it suffices to obtain a new version of the compiled code of the additional function and to replace the compiled code of the previous version recorded in memory with that of the new version.

The method allows to independently add various additional functions to a program.

Moreover, such a method allows to avoid a bootloader to install an additional function.

Furthermore, because such a method allows to dynamically add compiled additional functions to the compiled initial program, it is not necessary to use a virtual machine to interpret the compiled codes of the additional functions.

Such a method also allows to not have to protect against rollbacks to an older version of the program.

Moreover, such a method can allow to not store an image of the original program (factory image) in the memory of the microcontroller, since it is the original program that continues to be used even after the addition of additional functions to the program.

Such a method allows to avoid the use of a license system in which the program installed on the microcontroller initially comprises the additional functions in an unavailable state.

What is claimed is:
1. A method, comprising:
configuring, by a microcontroller, a first memory to store a table to indicate whether one or more additional functions for a computer program installed on the microcontroller are stored in a second memory, the table comprising:
a first field for storing identifiers, each identifier associated with a respective additional function, and
a second field for storing pointers, each pointer associated with a starting memory address of the second memory in which a respective additional function is stored, the second field including a null pointer for each additional function not stored in the second memory;
obtaining, by the microcontroller, a compiled code of an additional function to the computer program and an identifier of the additional function, wherein obtaining the compiled code of the additional function causes the microcontroller to add functionality to the computer program installed on the microcontroller without modifying compiled code or without obtaining a new version of the computer program installed on the microcontroller;

storing, by the microcontroller, the compiled code of the additional function in the second memory, wherein the second memory is of a non-volatile memory type; and storing, by the microcontroller in the first memory, a pointer in the second field of the table, the pointer pointing to a memory address of the second memory in which the compiled code of the additional function is stored, wherein the first memory is of a volatile memory type.

2. The method according to claim 1, wherein obtaining the compiled code of the additional function and the identifier of the additional function comprises:

receiving a packet from a remote server to a device hosting the microcontroller via an internet network, the packet containing the compiled code and metadata including at least the identifier, the compiled code being encrypted; and after receiving the packet, decrypting the compiled code of the additional function.

3. The method according to claim 2, wherein the packet is encrypted according to symmetrical encryption based on a unique key associated with the microcontroller, the microcontroller comprising the unique key.

4. The method according to claim 1, wherein the second memory is a flash memory.

5. The method according to claim 4, wherein the flash memory is internal to the microcontroller.

6. The method according to claim 1, wherein the first memory is a random-access memory of the microcontroller.

7. The method according to claim 1, further comprising:

obtaining, by the microcontroller, a hash value with the additional function and the identifier;

after obtaining the hash value, hashing, by the microcontroller, the compiled code of the additional function;

after hashing the compiled code, comparing, by the microcontroller, a result of the hash to the hash value obtained by the microcontroller; and after comparing the result, validating, by the microcontroller, the additional function only if the result of the hash is equal to the hash value obtained by the microcontroller.

8. A computer program product comprising a non-transitory computer-readable medium containing instructions which, when the instructions are executed by a microcontroller, cause the microcontroller to:

generate a table in a first memory, the table configured to indicate whether one or more additional functions for a computer program installed on the microcontroller are stored in a second memory, the table comprising:

a first field for storing identifiers, each identifier associated with a respective additional function, and a second field for storing pointers, each pointer associated with a starting memory address of the second memory in which a respective additional function is stored, the second field including a null pointer for each additional function not stored in the second memory;

obtain a compiled code of an additional function and an identifier of the additional function, wherein the compiled code and the identifier are received via a packet via an internet network from a remote server to a device hosting the computer program product, wherein obtaining the compiled code of the additional function causes the microcontroller to add functionality to the computer program installed on the microcontroller without modifying compiled code or without obtaining a new version of the computer program installed on the microcontroller;

store the compiled code of the additional function in the second memory; and store a pointer in the second field of the table, the pointer pointing to a memory address of the second memory in which the additional function is stored.

9. The computer program product according to claim 8, comprising further instructions which, when the computer program is executed by the microcontroller, cause the microcontroller to:

identify whether the additional function is available by verifying whether the identifier of the additional function is associated in the table with the pointer to the memory address;

when the additional function is available and called, obtain the memory address associated with the identifier of the additional function in the table; and after obtaining the memory address, execute the compiled code of the additional function recorded in the section of the second memory based on the obtained memory address.

10. The computer program product according to claim 8, wherein the instructions causing the microcontroller to obtain the compiled code of the additional function and the identifier of the additional function comprise further instructions to:

receive the packet containing the compiled code and metadata including at least the identifier, the compiled code being encrypted; and after receiving the packet, decrypt the compiled code of the additional function.

11. The computer program product according to claim 10, wherein the packet is encrypted according to symmetrical encryption based on a unique key associated with the microcontroller, the microcontroller comprising the unique key.

12. The computer program product according to claim 8, wherein the first memory is a random-access memory, and the second memory is a flash memory.

13. The computer program product according to claim 8, comprising further instructions which, when the computer program is executed by the microcontroller, cause the microcontroller to:

obtain a hash value with the additional function and the identifier;

after obtaining the hash value, hash the compiled code of the additional function;

after hashing the compiled code, compare a result of the hash to the hash value obtained by the microcontroller; and after comparing the result, validate the additional function only if the result of the hash is equal to the hash value obtained by the microcontroller.

14. A microcontroller configured to add an additional function to a computer program, the microcontroller comprising:

a first memory configured to store a table to indicate whether one or more additional functions for a computer program installed on the microcontroller are stored in a second memory, the table comprising:

a first field for storing identifiers, each identifier associated with a respective additional function, and a second field for storing pointers, each pointer associated with a starting memory address of the second memory in which a respective additional function is stored, the second field including a null pointer for each additional function not stored in the second memory;

the second memory configured to store the computer program and the one or more additional functions for the computer program; and a processor coupled to the first and second memories, the processor configured to:

obtain a compiled code of an additional function and an identifier of the additional function, wherein obtaining the compiled code of the additional function causes the microcontroller to add functionality to the computer program installed on the microcontroller without modifying compiled code or without obtaining a new version of the computer program installed on the microcontroller;

store the compiled code of the additional function in the second memory; and store, in the first memory, a pointer in the second field of the table, the pointer pointing to the memory address of the second memory in which the compiled code of the additional function is stored.

15. The microcontroller according to claim 14, wherein the processor configured to obtain the compiled code of the additional function and the identifier of the additional function comprises the processor configured to:

receive a packet containing the compiled code and metadata including at least the identifier, the compiled code being encrypted; and after receiving the packet, decrypt the compiled code of the additional function.

16. The microcontroller according to claim 15, wherein the packet is encrypted according to symmetrical encryption based on a unique key associated with the microcontroller, the microcontroller comprising the unique key.

17. The microcontroller according to claim 14, wherein the second memory is a flash memory.

18. The microcontroller according to claim 17, wherein the flash memory is internal to the microcontroller.

19. The microcontroller according to claim 14, wherein the first memory is a random-access memory of the microcontroller.

20. The microcontroller according to claim 14, wherein the processor is further configured to:

obtain a hash value with the additional function and the identifier;

after obtaining the hash value, hash the compiled code of the additional function;

after hashing the compiled code, compare a result of the hash to the hash value obtained by the microcontroller; and after comparing the result, validate the additional function only if the result of the hash is equal to the hash value obtained by the microcontroller.

\* \* \* \* \*